United States Patent
Parekh et al.

(10) Patent No.: US 10,929,858 B1
(45) Date of Patent: Feb. 23, 2021

(54) SYSTEMS AND METHODS FOR MANAGING CUSTOMER DATA

(71) Applicant: Walmart Apollo, LLC, Bentonville, AR (US)

(72) Inventors: Vivek Parekh, Fremont, CA (US); Marcus R. Tewksbury, Chelmsford, MA (US)

(73) Assignee: Walmart Apollo, LLC, Bentonville, AR (US)

( * ) Notice: Subject to any disclaimer, the term of this patent is extended or adjusted under 35 U.S.C. 154(b) by 332 days.

(21) Appl. No.: 14/213,565

(22) Filed: Mar. 14, 2014

(51) Int. Cl.
*G06Q 30/02* (2012.01)

(52) U.S. Cl.
CPC .............................. *G06Q 30/0201* (2013.01)

(58) Field of Classification Search
None
See application file for complete search history.

(56) References Cited

U.S. PATENT DOCUMENTS

| | | | | |
|---|---|---|---|---|
| 5,504,890 A | * | 4/1996 | Sanford | G06F 17/30554 |
| 5,701,423 A | * | 12/1997 | Crozier | G06F 15/0208 |
| | | | | 705/22 |
| 5,754,939 A | * | 5/1998 | Herz | G06Q 20/383 |
| | | | | 348/E7.056 |
| 5,944,787 A | * | 8/1999 | Zoken | G06Q 10/107 |
| | | | | 709/200 |
| 5,978,799 A | * | 11/1999 | Hirsch | G06F 17/30864 |
| 6,052,693 A | * | 4/2000 | Smith | G06F 17/30917 |
| 6,104,798 A | * | 8/2000 | Lickiss | H04L 41/5054 |
| | | | | 379/201.12 |
| 6,154,748 A | * | 11/2000 | Gupta | G06F 17/30569 |
| 6,240,414 B1 | * | 5/2001 | Beizer | G06F 17/30176 |
| 6,256,633 B1 | * | 7/2001 | Dharap | G06F 17/30867 |
| 6,374,241 B1 | * | 4/2002 | Lamburt | G06F 17/30873 |
| 6,389,429 B1 | * | 5/2002 | Kane | G06Q 10/06393 |
| | | | | 705/7.39 |
| 6,446,048 B1 | * | 9/2002 | Wells | G06Q 20/102 |
| | | | | 705/35 |
| 6,496,838 B1 | * | 12/2002 | Zamora-McKelvy | |
| | | | | G06F 17/30581 |
| | | | | 707/640 |

(Continued)

FOREIGN PATENT DOCUMENTS

| | | |
|---|---|---|
| WO | WO2000031671 A1 | 6/2000 |
| WO | WO2001063472 A3 | 12/2002 |

OTHER PUBLICATIONS

Affinity, definition, Dictionary webpages, undated https://www.dictionary.com/browse/affinity.*

*Primary Examiner* — Octavian Rotaru

(74) *Attorney, Agent, or Firm* — Patterson Thuente Pedersen, P.A.

(57) ABSTRACT

Example systems and methods for integration for managing customer data are described. In one implementation, a method receives a request for information about a specific customer and identifies multiple customer profiles associated with the specific customer. The method identifies the requested information within each of the customer profiles and determines whether any conflicting data values exist between the information within each of the customer profiles. If a conflict exists, the method determines an intended use of the requested information and resolves the conflict based on that intended use. A response is generated that includes the requested information about the specific customer.

2 Claims, 5 Drawing Sheets

(56) References Cited

U.S. PATENT DOCUMENTS

| | | | | |
|---|---|---|---|---|
| 6,519,571 B1* | 2/2003 | Guheen | G06Q 30/02 | 705/14.66 |
| 6,571,216 B1* | 5/2003 | Garg | G06Q 30/02 | 705/14.25 |
| 6,654,789 B1* | 11/2003 | Bliss | G06Q 10/107 | 709/203 |
| 6,668,253 B1* | 12/2003 | Thompson | G06Q 10/06 | |
| 6,732,092 B2* | 5/2004 | Lucas | G06F 17/30867 | 707/706 |
| 6,862,612 B1* | 3/2005 | Horn | G06Q 30/02 | 705/26.1 |
| 6,901,406 B2* | 5/2005 | Nabe | G06Q 30/02 | 705/38 |
| 6,931,408 B2* | 8/2005 | Adams | G06F 17/30321 | 707/812 |
| 6,965,865 B2* | 11/2005 | Pletz | G06Q 10/0631 | 705/346 |
| 6,970,880 B2* | 11/2005 | Camarillo | G06F 17/30569 | |
| 6,988,129 B2* | 1/2006 | Quine | G06Q 10/107 | 705/76 |
| 7,062,510 B1* | 6/2006 | Eldering | G06Q 30/02 | |
| 7,069,231 B1* | 6/2006 | Cinarkaya | G06Q 30/02 | 705/7.29 |
| 7,124,096 B2* | 10/2006 | Dutta | G06Q 30/02 | 705/26.61 |
| 7,124,144 B2* | 10/2006 | Christianson | G06F 17/30569 | |
| 7,155,403 B2* | 12/2006 | Cirulli | G06Q 20/204 | 705/17 |
| 7,213,032 B2* | 5/2007 | Mascarenha | G06Q 30/02 | 707/781 |
| 7,233,927 B1* | 6/2007 | Norton | G06F 21/33 | 705/67 |
| 7,254,573 B2* | 8/2007 | Burke | G06Q 10/107 | |
| 7,290,256 B2* | 10/2007 | Anderson | G06Q 10/06 | 707/999.008 |
| 7,610,390 B2* | 10/2009 | Yared | G06F 21/41 | 709/227 |
| 7,707,159 B2* | 4/2010 | Christianson | G06F 17/30923 | 707/999.102 |
| 7,747,611 B1* | 6/2010 | Milic-Frayling | G06F 17/30867 | 707/722 |
| 7,756,904 B2* | 7/2010 | Draper | G06F 17/2205 | 707/803 |
| 7,788,499 B2* | 8/2010 | Cameron | G06F 21/33 | 713/185 |
| 7,813,956 B2* | 10/2010 | Doerwald | G06Q 30/02 | 705/14.36 |
| 7,856,646 B1* | 12/2010 | Groff | G06Q 30/00 | 725/34 |
| 7,907,714 B2* | 3/2011 | Baniak | H04M 3/42153 | 379/201.02 |
| 7,945,630 B2* | 5/2011 | King | G06Q 10/107 | 709/206 |
| 7,958,142 B2* | 6/2011 | Li | G06Q 30/02 | 707/770 |
| RE42,869 E* | 10/2011 | Boe | G06Q 30/02 | 705/14.19 |
| 8,175,908 B1* | 5/2012 | Anderson | G06Q 30/0201 | 705/7.29 |
| 8,224,753 B2* | 7/2012 | Atef | G06F 21/31 | 340/5.8 |
| 8,234,181 B2* | 7/2012 | Berger | G06Q 10/109 | 705/26.5 |
| 8,290,951 B1* | 10/2012 | Joa | G06Q 40/02 | 707/736 |
| 8,326,898 B2* | 12/2012 | Woolston | G06Q 10/107 | 705/60 |
| 8,386,528 B2* | 2/2013 | Blohm | G06F 3/1296 | 707/610 |
| 8,549,061 B2* | 10/2013 | Rao | G06Q 30/08 | 709/200 |
| 8,566,866 B1* | 10/2013 | Fleischman | H04N 21/23424 | 707/769 |
| 8,583,680 B2* | 11/2013 | Hoang | G06Q 10/10 | 707/769 |
| 8,650,083 B2* | 2/2014 | Doughty | G06Q 30/0269 | 705/14.49 |
| 8,725,570 B2* | 5/2014 | Doughty | G06Q 30/0269 | 705/14.4 |
| 8,756,692 B2* | 6/2014 | Williams | G06Q 30/0241 | 726/24 |
| 8,782,016 B2* | 7/2014 | Kaldas | G06F 17/30303 | 707/690 |
| 8,799,076 B2* | 8/2014 | Doughty | G06Q 30/0269 | 705/14.49 |
| 8,819,789 B2* | 8/2014 | Orttung | G06F 21/40 | 705/318 |
| 8,898,074 B2* | 11/2014 | Doughty | G06Q 30/0269 | 705/14.49 |
| 8,977,953 B1* | 3/2015 | Pierre | G06F 16/38 | 715/230 |
| 9,177,053 B2* | 11/2015 | Myslinski | G06Q 10/10 | |
| 9,275,125 B1* | 3/2016 | Mungur | G06F 17/30575 | |
| 9,342,833 B2* | 5/2016 | Mathew | G06Q 30/02 | |
| 9,454,526 B1* | 9/2016 | Kapoor | G06F 17/30 | |
| 9,477,737 B1* | 10/2016 | Charyk | G06F 17/30575 | |
| 9,569,801 B1* | 2/2017 | Xu | G06Q 50/01 | |
| 2001/0025274 A1* | 9/2001 | Zehr | G06Q 10/107 | 705/402 |
| 2001/0044942 A1* | 11/2001 | Cummings | G06Q 30/02 | 800/320.1 |
| 2002/0007421 A1* | 1/2002 | Dixon | H04L 29/1215 | 709/238 |
| 2002/0032740 A1* | 3/2002 | Stern | G06F 17/30864 | 709/206 |
| 2002/0042815 A1* | 4/2002 | Salzfass | H04L 12/5855 | 709/206 |
| 2002/0055932 A1* | 5/2002 | Wheeler | G06F 17/30557 | |
| 2002/0082972 A1* | 6/2002 | Renwick | G06Q 30/06 | 705/37 |
| 2002/0087573 A1* | 7/2002 | Reuning | G06Q 10/06 | |
| 2002/0156895 A1* | 10/2002 | Brown | G06Q 10/00 | 709/226 |
| 2002/0169653 A1 | 11/2002 | Greene | | |
| 2002/0169748 A1* | 11/2002 | Macholda | H04L 29/06 | |
| 2003/0014373 A1* | 1/2003 | Perge | G06Q 10/10 | 705/80 |
| 2003/0069874 A1* | 4/2003 | Hertzog | G06Q 10/109 | |
| 2003/0182018 A1* | 9/2003 | Snapp | G06Q 10/08 | 700/225 |
| 2003/0198336 A1* | 10/2003 | Rodenbusch | H04M 3/5158 | 379/265.02 |
| 2003/0216982 A1* | 11/2003 | Close | G06Q 40/00 | 705/35 |
| 2004/0162802 A1* | 8/2004 | Jonas | G06F 17/30578 | |
| 2004/0186896 A1* | 9/2004 | Daniell | G06Q 10/107 | 709/207 |
| 2004/0230565 A1* | 11/2004 | Burke | G06Q 10/107 | |
| 2004/0243571 A1* | 12/2004 | Judd | G06F 17/30371 | |
| 2005/0021551 A1* | 1/2005 | Silva | G06F 17/30495 | |
| 2005/0044015 A1* | 2/2005 | Bracken | G06Q 20/04 | 705/30 |
| 2005/0044423 A1* | 2/2005 | Mellmer | G06F 21/31 | 726/4 |
| 2005/0065950 A1* | 3/2005 | Chaganti | H04L 63/0428 | |
| 2005/0075988 A1* | 4/2005 | Cordery | A47G 29/1209 | 705/404 |
| 2005/0097173 A1* | 5/2005 | Johns | G06F 17/3028 | 709/206 |
| 2005/0124320 A1* | 6/2005 | Ernst | H04M 3/4931 | 455/411 |
| 2005/0160167 A1* | 7/2005 | Cheng | G06Q 10/06 | 709/224 |
| 2005/0165643 A1* | 7/2005 | Wilson | G06Q 30/02 | 705/14.53 |
| 2005/0165797 A1* | 7/2005 | Nair | G06Q 10/10 | |
| 2005/0234913 A1* | 10/2005 | Carone | G06Q 40/02 | |
| 2005/0240580 A1* | 10/2005 | Zamir | G06F 17/30867 | |

(56) References Cited

U.S. PATENT DOCUMENTS

| | | | |
|---|---|---|---|
| 2006/0112133 A1* | 5/2006 | Ljubicich | G06F 17/30958 |
| 2006/0265253 A1* | 11/2006 | Rao | G06F 19/321 705/3 |
| 2007/0147269 A1* | 6/2007 | Ettle | H04L 45/12 370/254 |
| 2007/0174389 A1* | 7/2007 | Armstrong | G06F 17/30867 709/204 |
| 2007/0277110 A1* | 11/2007 | Rogers | G06Q 10/10 715/736 |
| 2007/0282877 A1* | 12/2007 | Fischer | G06Q 30/02 |
| 2007/0282949 A1* | 12/2007 | Fischer | G06Q 10/10 709/204 |
| 2007/0282980 A1* | 12/2007 | Fischer | G06Q 90/00 709/219 |
| 2007/0282987 A1* | 12/2007 | Fischer | G06Q 10/10 709/223 |
| 2008/0004991 A1* | 1/2008 | Aikens | G06Q 10/00 705/26.1 |
| 2008/0077525 A1* | 3/2008 | Willey | G06Q 20/04 705/40 |
| 2008/0109378 A1* | 5/2008 | Papadimitriou | G06Q 30/02 705/36 R |
| 2008/0120271 A1* | 5/2008 | Hunt | G06Q 10/10 |
| 2008/0134053 A1* | 6/2008 | Fischer | G06Q 10/02 715/747 |
| 2009/0083367 A1* | 3/2009 | Li | G06Q 30/02 709/202 |
| 2009/0156239 A1 | 6/2009 | Rodin | |
| 2009/0276289 A1* | 11/2009 | Dickinson | G06Q 10/063 705/7.29 |
| 2010/0114941 A1* | 5/2010 | Von Kaenel | G06F 17/30241 707/769 |
| 2010/0180029 A1* | 7/2010 | Fourman | G06F 17/30867 709/225 |
| 2010/0250578 A1* | 9/2010 | Athsani | G06F 17/30029 707/765 |
| 2010/0274815 A1* | 10/2010 | Vanasco | G06F 17/30867 707/798 |
| 2011/0099338 A1* | 4/2011 | Binz | G06F 12/0246 711/154 |
| 2011/0153390 A1* | 6/2011 | Harris | G06Q 30/02 705/7.32 |
| 2011/0166979 A1* | 7/2011 | Zoldi | G06Q 10/0635 705/35 |
| 2011/0191337 A1* | 8/2011 | Cort | G06F 3/048 707/728 |
| 2011/0231874 A1* | 9/2011 | Goode | G06Q 10/10 725/37 |
| 2011/0288868 A1* | 11/2011 | Lloyd | H04M 1/271 704/251 |
| 2012/0005053 A1* | 1/2012 | Burgess | G06Q 30/02 705/35 |
| 2012/0022930 A1* | 1/2012 | Brouhard | G06Q 30/02 705/14.22 |
| 2012/0088220 A1* | 4/2012 | Feng | G09B 7/00 434/362 |
| 2012/0089644 A1* | 4/2012 | Doggett | G06Q 10/109 707/780 |
| 2012/0109882 A1* | 5/2012 | Bouse | H04L 67/306 707/607 |
| 2012/0110071 A1* | 5/2012 | Zhou | G06Q 10/10 709/204 |
| 2012/0158668 A1* | 6/2012 | Tu | G06F 17/30882 707/687 |
| 2012/0210244 A1* | 8/2012 | de Francisco Lopez | H04L 63/102 715/747 |
| 2012/0278881 A1* | 11/2012 | Mann | G06F 21/6218 726/17 |
| 2012/0290610 A1* | 11/2012 | Hoang | G06Q 10/10 707/769 |
| 2013/0006717 A1* | 1/2013 | Oleson | G06Q 10/06311 705/7.41 |
| 2013/0024367 A1* | 1/2013 | Bellefeuille | G06Q 30/04 705/40 |
| 2013/0060587 A1* | 3/2013 | Bayrak | G06Q 10/10 705/7.11 |
| 2013/0066922 A1* | 3/2013 | Jang | G06Q 10/00 707/802 |
| 2013/0124315 A1* | 5/2013 | Doughty | G06Q 30/0269 705/14.53 |
| 2013/0124324 A1* | 5/2013 | Doughty | G06Q 30/0269 705/14.58 |
| 2013/0124327 A1* | 5/2013 | Doughty | G06Q 30/0269 705/14.64 |
| 2013/0124330 A1* | 5/2013 | Doughty | G06Q 30/0269 705/14.66 |
| 2013/0124331 A1* | 5/2013 | Doughty | G06Q 30/0269 705/14.66 |
| 2013/0124332 A1* | 5/2013 | Doughty | G06Q 30/0269 705/14.66 |
| 2013/0124333 A1* | 5/2013 | Doughty | G06Q 30/0269 705/14.66 |
| 2013/0226862 A1* | 8/2013 | Tang | G06Q 50/22 707/609 |
| 2013/0268367 A1* | 10/2013 | Erdogan | G06Q 30/0277 705/14.64 |
| 2013/0268553 A1 | 10/2013 | Surry | |
| 2013/0339220 A1* | 12/2013 | Kremen | G06Q 40/025 705/38 |
| 2014/0034722 A1* | 2/2014 | Han | G06Q 30/0271 235/375 |
| 2014/0044243 A1* | 2/2014 | Monegan | G06Q 30/016 379/88.01 |
| 2014/0068266 A1* | 3/2014 | Cismas | H04L 9/321 713/171 |
| 2014/0074928 A1* | 3/2014 | B'Far | H04L 67/306 709/204 |
| 2014/0136398 A1* | 5/2014 | Nagel | G06Q 40/02 705/39 |
| 2014/0207578 A1* | 7/2014 | Doughty | G06Q 30/0269 705/14.64 |
| 2014/0214480 A1* | 7/2014 | Jamal | G06Q 30/0201 705/7.29 |
| 2014/0244401 A1* | 8/2014 | Doughty | G06Q 30/0269 705/14.66 |
| 2014/0244641 A1* | 8/2014 | Patterson | G06F 17/30867 707/737 |
| 2014/0359782 A1* | 12/2014 | Golic | G06F 21/6254 726/26 |
| 2014/0379554 A1* | 12/2014 | Grossman | G06Q 40/025 705/38 |
| 2015/0006672 A1* | 1/2015 | Morel | G06Q 30/0269 709/217 |
| 2015/0248696 A1* | 9/2015 | Fernandez | G06Q 30/0253 705/14.51 |
| 2015/0363478 A1* | 12/2015 | Haynes | G06F 17/30572 707/625 |

* cited by examiner

SYSTEMS AND METHODS FOR MANAGING CUSTOMER DATA

RELATED APPLICATIONS

This application is related to U.S. application Ser. No. 14/213,687, filed Mar. 14, 2014. The disclosure of which is incorporated herein by reference in its entirety.

TECHNICAL FIELD

The present disclosure relates to systems and methods for managing customer data, such as customer profile data.

BACKGROUND

Today's customers do not typically shop in one place, nor use one channel (e.g., online or offline) to search and shop for items. To meet consumer demands and improve consumer experience, some retailers provide a multi-channel retail environment to allow customers to shop using any number of channels. For example, some retailers have physical (brick and mortar) stores as well as online stores, which allow each customer to shop in a way that is most convenient to the customer. However, the multi-channel retail environment also creates a major customer relationship challenge for retailers because consumers become increasingly fragmented in the channels used by the customers. Thus, it is difficult for retailers that provide a multi-channel retail environment to have a comprehensive understanding of any given customer's wants and needs.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
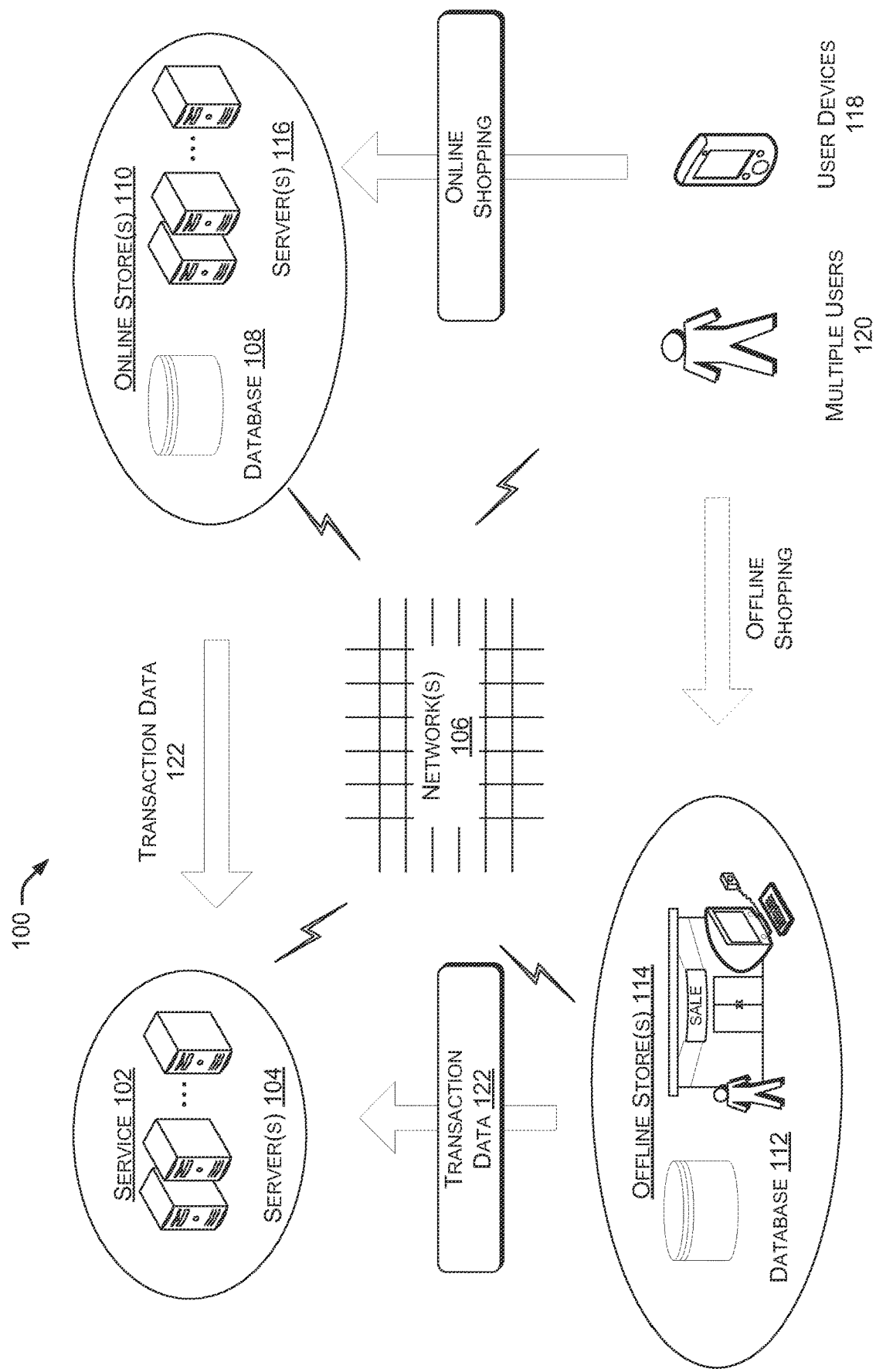
FIG. 1 is a block diagram depicting a computing environment within which an example embodiment of the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a block diagram depicting a computing environment 100 within which an example embodiment of the present disclosure may be implemented. Computing environment 100 includes a service 102 (e.g., customer as a service) that may include a set of software and/or hardware that may be used to collect, analyze, and/or manage customer data and transaction data, to provide information to improve customer experience and the like. Service 102 may be implemented by one or more servers 104. For simplicity, the term "server 104" is used to refer to the one or more servers 104.

Server 104 may be connected to one or more networks 106 (e.g., data communication networks) to exchange information with a database 108 associated with one or more online stores 110 and/or a database 112 associated with one or more offline stores 114. For simplicity, the terms "online store 110" and "offline store 114" are used to refer to the one or more online stores 110 and one or more offline stores 114, respectively. Offline store 114 may also be referred to as a "physical store" or a "brick-and-mortar store." In some embodiments, online store 110 and offline store 114 may be associated with a business entity (e.g., a retailer) that provides a multi-channel retail environment. For example, offline store 114 may refer to a place where items are kept for future use or sale, or a store of which a portion of the store's merchandises (i.e., services and/or products) are provided through a physical store. In some embodiments, offline store 114 may include, for example, one or more of the following: a retailer store, a retail club store, a restaurant, a gas station, a beauty salon, a fitness center, and any other brick-and-mortar store with a physical presence. A retail club store is, for example, an offline store that requires customers to pay periodic (e.g., annual) membership fees in order to shop at the store. For example, the retail club store may issue a membership card to a member customer as an identification to allow the member customer to shop at the retail club. A retailer store is an offline store that does not require customers to pay periodic membership fees in order to shop there.

Online store 110 may include a website that offers online merchandise for sale such as, for example, an acquisition activity that a consumer visits the website and purchases merchandise via the website. The website of online store 110 may be maintained by server 116 associated with online store 110. For example, server 116 may be connected to network 106 to exchange information with multiple user devices 118 associated with multiple users 120. Each of the user devices 118 may be a mobile or desktop computer, a personal data assistant (PDA), an internet appliance, an internet enabled mobile phone, a server or any other computing device capable of communicating with network 106.

Network 106 may include one or more wired and/or wireless networks that enable communications between the various computing devices described in environment 100. In some embodiments, network 106 may include local area networks (LANs), wide area networks (WAN), mobile telephone networks (MTNs), and other types of networks, possibly used in conjunction with one another, to facilitate communication between the various computing devices (e.g., server 104, server 116, and user devices 118).

Through network 106, server 104 may retrieve transaction data 122 from offline store 114 (e.g., database 112) and/or online store 110 (e.g., database 108). In some embodiments, transaction data 122 may represent elements of one or more transactions. For example, transaction data 122 may include sales, prices, pricing changes, sales orders, financial transactions, revenues, conversional rate, profits, and/or any other business transaction data associated with one or more items. Transaction data 122 may be collected via multiple transaction channels.

In some embodiments, the multiple transaction channels may include a variety of transaction channels in which a customer may conduct research, experience a brand, make a purchase associated with one or more items, and the like. Such transaction channels may include, for example, some or all of the following: offline stores, online stores, mobile stores, mobile app stores, catalog (e.g., telephone sales, mail sales, and fax sales) and/or any other method of transacting with a customer. The transacting may include browsing, buying, returning, pre- and post-sale service, and the like. In some embodiments, retailers may use multiple channel simultaneously. For example, in an offline store channel (e.g., offline store 114), consumers who visited the offline store tend to be well-informed about a certain product's features and prices, and therefore may expect store employees to know more.

Through network 106, server 104 may retrieve customer profile information associated with, for example, multiple users 120. For example, the customer profile information may include a collection of records of customer information and behavior that is, for example, associated with one or more online and/or offline transactions. For example, customer profile information may include a description of a customer or set of customers that includes demographic, geographic, and psychographic characteristics, as well as buying patterns, creditworthiness, and purchase history. The customer profile information may be obtained from store receipts, credit card purchases, mail-order requests, information inquiries, membership information, user profile information, browsers, cookies, and other sources related to customer preferences or predisposition to purchasing or using an item. Customer online profile information refers to a collection of records of customer online behavior related to, for example, customer online preferences or predisposition to purchasing or using an item.

In some embodiments, server 104 may also exchange information with multiple data sources that provide information regarding, for example, multiple user s120, the market (e.g., market analysis), a competitor of the business entity, and the like.

Figure 2:
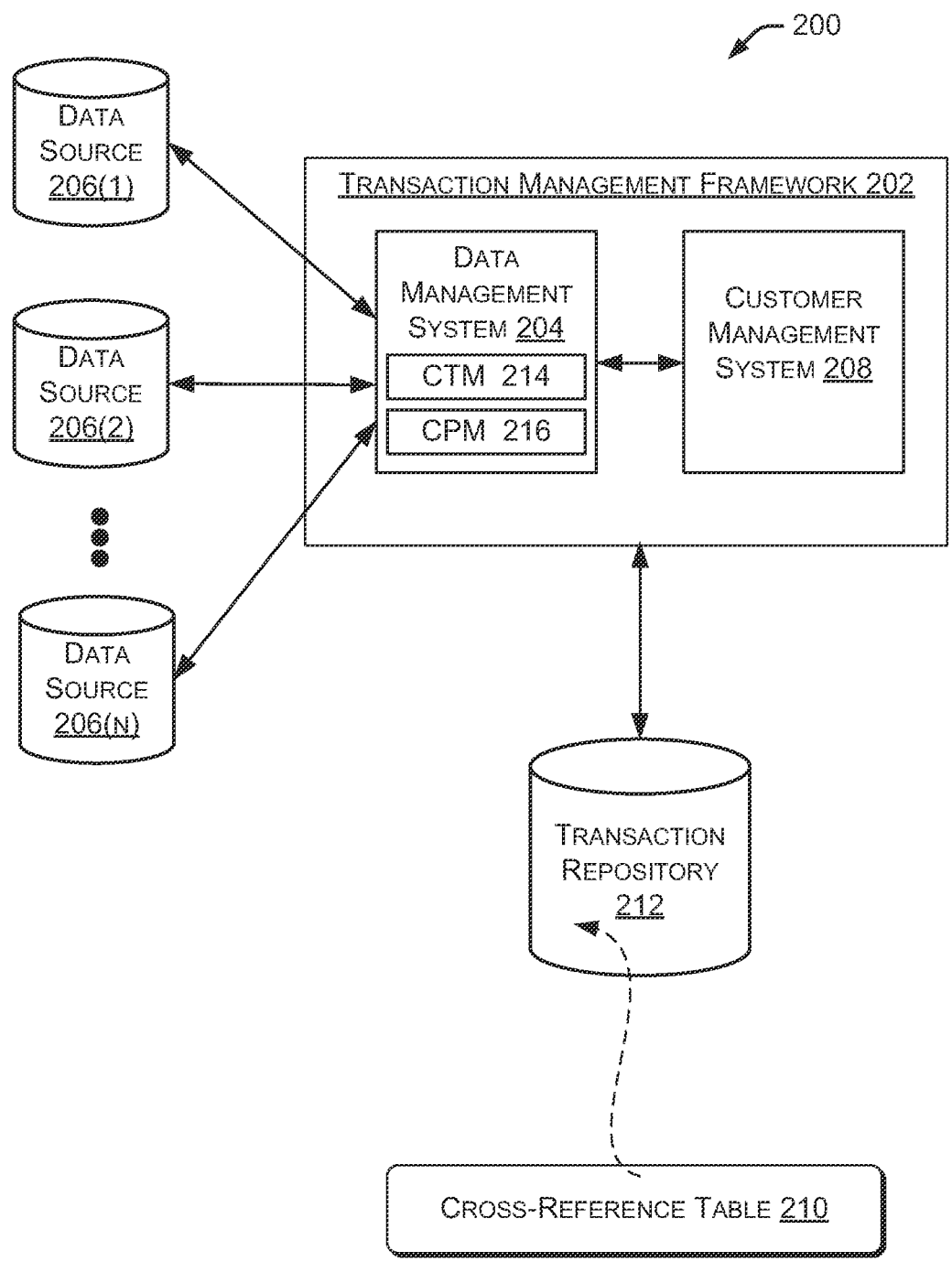
FIG. 2 is a block diagram depicting a computing architecture within which an example embodiment of the present disclosure may be implemented.

FIG. 2 is a block diagram depicting a computing architecture 200 within which an example embodiment of the present disclosure may be implemented. Computing architecture 200 illustrates an example of a customer knowledge platform (CKP). Computing architecture 200 may include a transaction management framework 202 configured to retrieve data (e.g., transaction data 122, customer profile information, and so forth) from data sources (e.g., databases 108, 112, user devices 118, and the like). Transaction management framework 202 may also analyze and/or manage transaction data 122 and the customer profile information. At least a portion of service 102 may be implemented by transaction management framework 202.

In some embodiments, transaction management framework 202 may include a data management system 204 configured to collect, analyze manage and/or maintain transaction data 122. Transaction data 122 may be organized in various models such as, for example, a customer transaction model (CTM) 214 and a customer profile model (CPM) 216. Data management system 204 may retrieve transaction data 122 from multiple data sources 206(1), 206(2) ... 206(n). Examples of data sources 206 may include database 108, database 112, and other data sources that provide information regarding, for example, multiple users 120, the market (e.g., market analysis), a competitor of the business entity, and the like.

In some embodiments, data management system 204 may extract metadata from transaction data 122. The metadata may include traceable source data, identifiable source data, trend source data, etc. In some embodiments, the traceable source data may include data providing a certain characteristic of a transaction that may be used to determine a customer related to the transaction. For example, credit card information may be used to identify the customer who conducts the transaction using the credit card. The traceable source data may include transaction information such as, credit cards, personal checks, money orders, cards associated with government assistance program (e.g., electronic benefit transfer (EBT) cards), debit cards, gift cards, discount cards, etc.

The identifiable source data may include data describing a certain characteristic of a transaction that may be associated with a customer related to the transaction. In some embodiments, the identifiable source data may also be used to determine a customer related to the transaction while less accurate than the traceable source data with respect to determining certain customers. The identifiable source data may include transaction information related to, for example, club cards (e.g., club cardholder number), use online profile (e.g., customer online IDs), and social media data that are associated with the transaction.

The trend source data may include data describing a market trend, which may be used to predict the association between transactions and customers in the future. The trend source data may be collected from a supplier related to the business entity.

In some embodiments, data management system 204 may generate and maintain, for example, multiple tables (e.g., decode tables) based at least in part on the metadata. For example, data management system 204 may extract information associated with one or more customers from transaction records involving credit card payments, and generate a traceable tender decode table (e.g., a credit card decode table). Similarly, data management system 204 may also generate one or more traceable tender decode tables for checks and other financial instrument associated with the traceable source data. In some embodiments, data management system 204 may generate a legacy source decode table based on identifiable source data (e.g., a club cardholder number, an online profile identifier (ID), and the like). In some embodiments, data management system 204 may generate one or more traceable tender decode tables based on at least one of the traceable source data, the identifiable source data, and the trend source data.

Data management system 204 may be connected to a customer management system 208 configured to manage customers (e.g., multiple users 120). For example, customer management system 208 may identify a customer based on transaction data 122 and assign a customer unique ID (CUID) to the customer. In a certain set of customers managed by the customer management system 208, a CUID may be an identifier (e.g., a serial number, a random number, a code, etc.) which is unique among the set of identifiers used for the set of customers.

In some embodiments, transaction management framework 202 may create a preliminary table indicating a decode between a CUID and encoded tenders (e.g., transactions using one or more credit cards) that the customer uses in an offline store (e.g., an offline retail store) of the business entity. In some embodiments, transaction management framework 202 may create a primary table indicating a decode between a CUID and IDs used in sources such as an offline retail club store, and/or the website maintained by the business entity. In these instances, the preliminary table may include multiple columns represented by content items such as, for example, an encoded transition, a type of transaction, a degree of correlation confident between CUID and decode (e.g., 90% confident), a description of a related household/individual customer, etc. In some embodiments, one or more of the content items may be joinable to other content items associated with data sources 206.

Transaction management framework 202 may also create a cross-reference table 210, which is maintained in a transaction repository 212. For example, transaction management framework 202 may create cross-reference table 210 using one or more preliminary tables. In some embodiments, cross-reference table 210 may include cross references between content items (e.g., transaction records, customers, etc.) represented therein. For example, the cross-reference table 210 may include a column representing traceable tender decodes and/or a column representing legacy tender decodes. The cross-reference table 210 may also include a column representing CUIDs correlated to one or more traceable tender decode and/or legacy tender decode.

Through cross-reference table 210, transaction management framework 202 may join two or more decode tables together via a primary key, which may be used through transaction data 122 to identify transaction records matching the primary key. The primary key may be a certain characteristic/attribute of traceable source data and/or identifiable source data. For example, the primary key may include a traceable tender decode (e.g., a credit card number, a check ID, etc.) retrieved from the traceable source data and/or a legacy source decode (e.g., a club cardholder number, an online profile ID, etc.) retrieved from the deniable source data.

Figure 3:
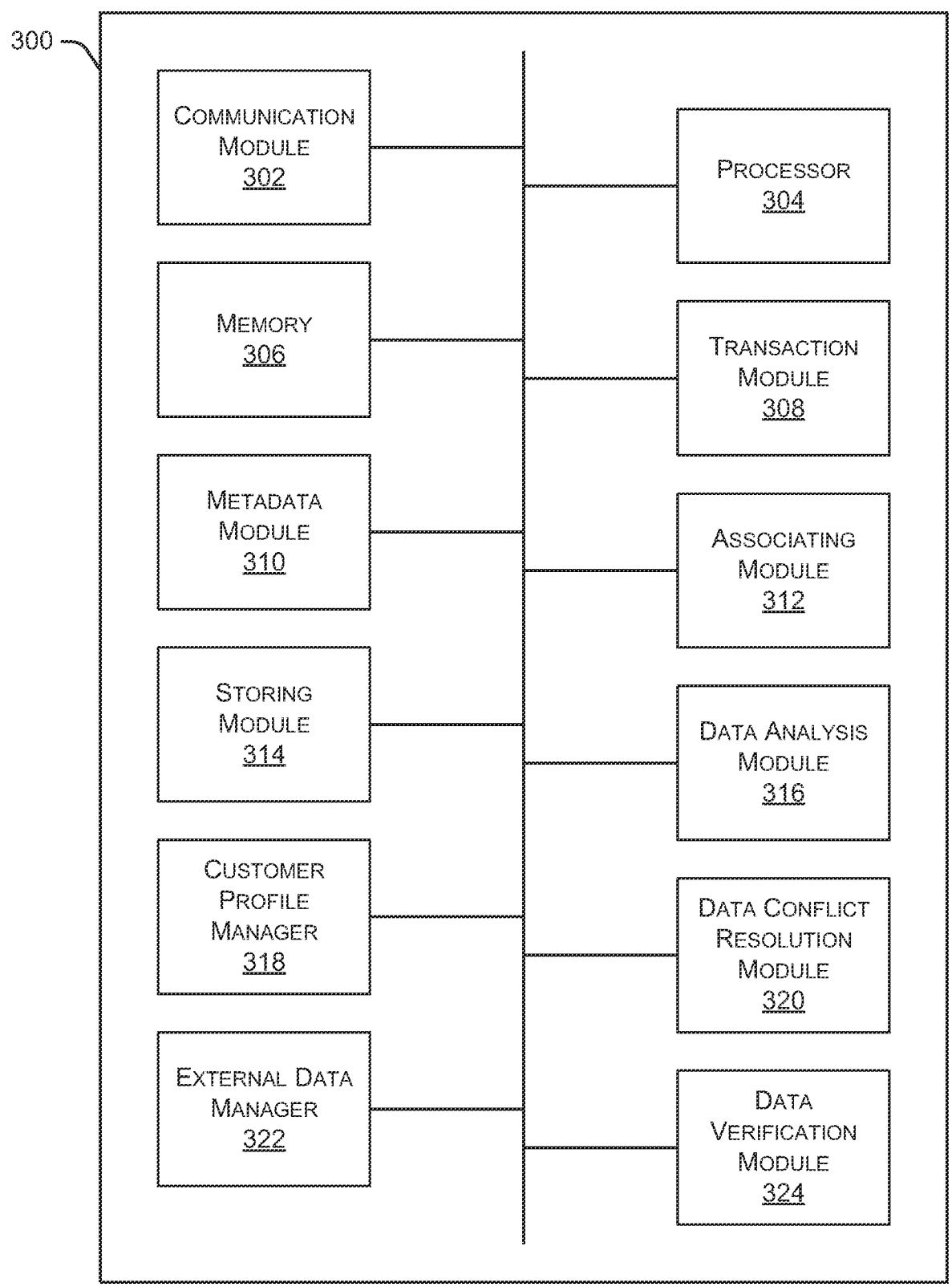
FIG. 3 is a block diagram depicting an embodiment of a computing device configured to implement systems and methods of the present disclosure.

FIG. 3 is a block diagram depicting an embodiment of a computing device 300 configured to implement systems and methods of the present disclosure. Computing device 300 (e.g., server 104) performs various functions related to, for example, managing customer information, as discussed herein. In some embodiments, computing device 300 may include one or more separate computing devices that cooperatively implement the functions described herein. Computing device 300 may include a communication module 302, a processor 304, and a memory 306. Communication module 302 allows computing device 300 to communicate with other systems, such as communication networks, other servers, and the like. Processor 304 executes one or more sets of instructions to implement the functionality provided by computing device 300. Memory 306 stores these instructions as well as other data used by processor 304 and other modules contained in computing device 300.

Computing device 300 may also include a transaction module 308 configured to retrieve a transaction record associated with a business entity and/or a customer. For example, transaction module 308 may retrieve transaction records from database 108, database 112, etc.

Computing device 300 may also include a metadata module 310 configured to extract metadata associated with a transaction record from the transaction record. For example, metadata module 310 may extract traceable source data indicating a customer associated with the transaction record.

In some embodiments, the traceable source data may include information related to a financial instrument used in a transaction of the transaction record, and the financial instrument is traceable to identify the customer associated the transaction. For example, the financial instrument may include at least one of the following that are associated with the customer: a credit card, a personal check, a money order, an electronic benefit transfer (EBT) card, a gift card, and a discount card. In some embodiments, the traceable source data is generated based on information retrieved from an offline retail store and an offline club store that are associated with the same business entity.

In some embodiments, metadata module 310 may extract identifiable source data including information associated with a club card issued to the customer by the business entity or an affiliate of the business entity.

Computing device 300 may also include an associating module 312 that generates a correlation between the metadata and a CUID of the customer. For example, associating module 312 may generate the correlation between the CUID and at least one of the traceable source data and the identifiable source data. In some embodiments, the metadata may also include identifiable source data including information associated with an online user identifier of the customer associated with a web service of the business entity or an affiliate of the business entity.

In some embodiments, the metadata may include trend source data including information that is provided by a supplier of the business entity, and the trend source data indicates a market trend associated with an item involved in a transaction of the transaction record. In particular embodiments, associating module 312 may generate the correlation among the traceable source data, the identifiable source data, the identifiable source data, the trend source data, and the CUID.

Computing device 300 may also include a storing module 314 that stores the correlation between the CUID and the traceable source data in cross-reference table 210. For example, storing module 314 may maintain cross-reference table 210 in a repository (e.g., transaction repository 212) that contains transaction information on a stock keeping unit (SKU) level across an offline retail store, an offline club store, and an online store that are associated with the business entity.

Computing device 300 may also include a data analysis module 316 configured to determine a customer marketing parameter of the customer based at least in part on the correlation between the CUID and at least one of the traceable source data, the identifiable source data, and the trend source data.

In some embodiments, the customer marketing parameter may include one or more metrics that may be used to measure customer behavior for a business purpose. For example, a customer marketing parameter may include a churn rate, customer lifetime value, customer marketing impact, etc. For example, data analysis module 316 may determine at least one of the following that are associated with the customer: a churn rate in a predetermined time period, a customer lifetime value, a customer marketing impact of a marketing campaign in the predetermined time period, and an acquisition rate in the predetermined time period.

The churn rate may be a measure of the number of individuals or items moving out of a collective over a specific period of time. For example, a customer churn rate may refer to a loss of customers during a predetermined time period when the customers cease their relationship with a certain entity (e.g., a retail company) or a particular section of the certain entity (e.g., physical stores of the retail company). A churn rate may be represented in various ways such as, for example, a number of customers lost, a percentage of customers lost, value of recurring business lost, a percentage of recurring value lost, and the like.

Conversion rate or acquisition rate may refer to the proportion of visitors to an offline store who make a purchase. Customer lifetime value (CLV) may be represented by a prediction of the net profit attributed to the entire future relationship with a customer. For example, CLV may be represented by the dollar value of a customer relationship based on the present value of the projected future cash flows from the customer relationship. CLV may be used to enable users (e.g., retail companies) to shift their focus from quarterly profits to the long-term health of their customer relationships. Customer lifetime value is an important number because it represents an upper limit on spending to acquire new customers reference decode table.

In some embodiments, computing device 300 also includes a customer profile manager 318 and a data conflict resolution module 320. As discussed herein, customer profile manager 318 manages various aspects of multiple customer profiles. Data conflict resolution module 320 manages the resolution of conflict between different data values in different profiles associated with the same use. In some embodiments, data conflict resolution manager 320 accesses data from one or more external data sources to resolve data conflicts.

In particular embodiments, computing device 300 may include an external data manager 322 and a data verification module 324. External data manager 322 manages the accessing of data from one or more external data sources. Data verification module 324 handles various data verification tasks, as described herein.

Figure 4:
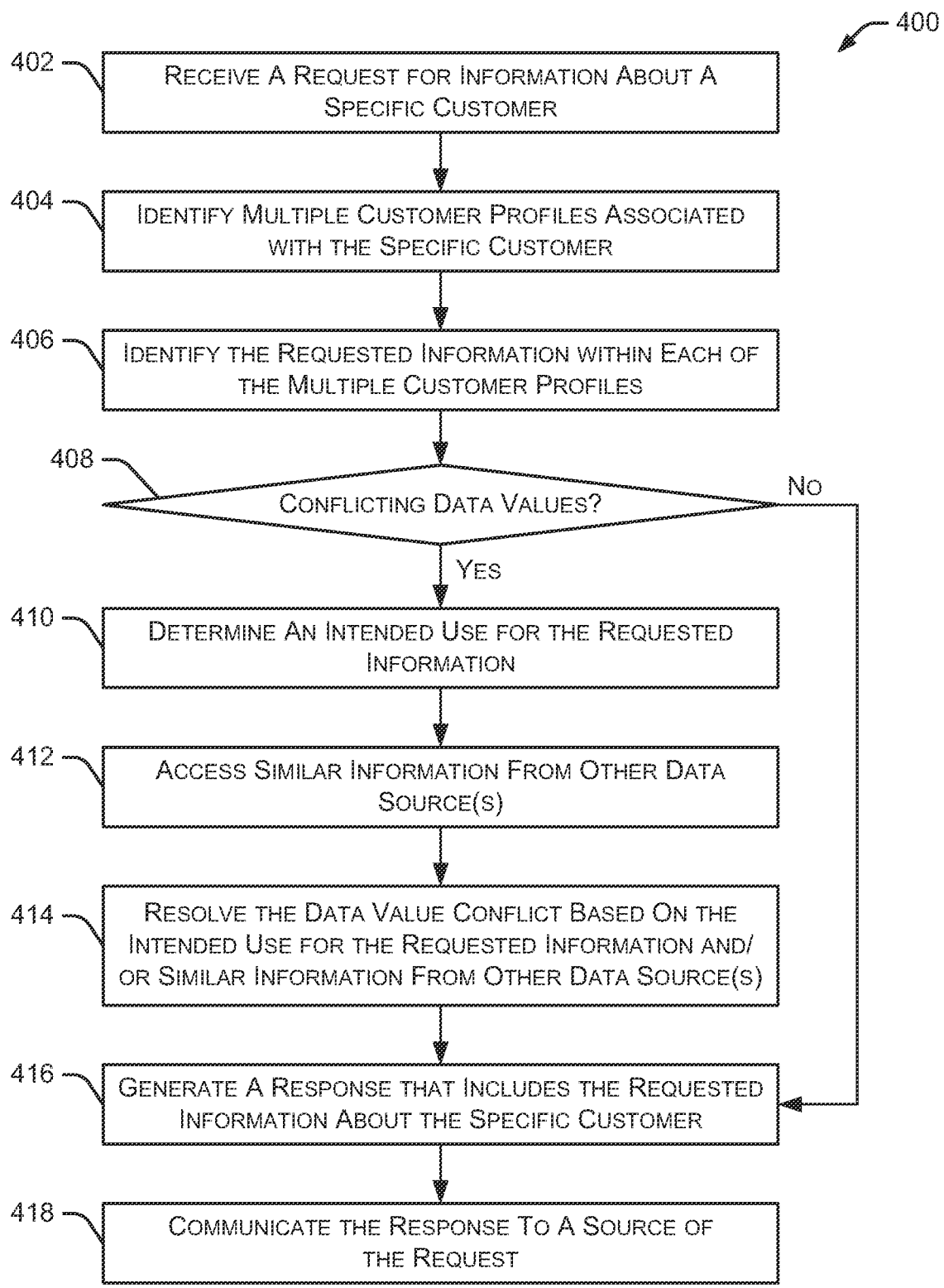
FIG. 4 is a flow diagram depicting an embodiment of a method for managing data associated with multiple customer profiles.

FIG. 4 is a flow diagram depicting an embodiment of a method 400 for managing data associated with multiple customer profiles. As discussed herein, customer profile information may include, for example, a description of a customer or set of customers that includes demographic, geographic, and psychographic characteristics, as well as buying patterns, creditworthiness, and purchase history. Initially, method 400 receives a request for information about a specific customer at 402. This request may be received, for example, from a particular organization (or entity) or a department (or subsidiary) within an organization or entity. In response to the request, method 400 identifies multiple customer profiles associated with the specific customer at 404. As discussed herein, a CUID may identify links to multiple customer profiles within the same organization or at different organizations. For example, a particular customer may have a first customer profile associated with an offline store, a second customer profile associated with an online store, and a third customer profile associated with a retail club store.

By supporting multiple customer profiles for the same customer, instead of attempting to merge (or flatten) multiple customer profiles into a single customer profile, the systems and methods described herein identify a primary customer profile (assigned the CUID) and create links to all other customer profiles without deleting or combining any of the customer profile data. Thus, a particular customer is represented as multiple customer profiles accessed using the CUID. This approach maintains all customer profiles and allows the systems and methods discussed herein to access and analyze all data related to a particular customer from all customer profiles. The systems and methods described herein store the CUID information and the links between the CUID and the other customer profiles in a database or other storage mechanism for access by other systems and processes.

Method 400 continues by identifying the requested information within each of the multiple customer profiles at 406. Method 400 then determines whether a conflict exists between the identified data within each of the multiple customer profiles at 408. A conflict occurs when the same data (or data field) has different values in different customer profiles. For example, different phone numbers in two of the customer profiles, different mailing addresses, and the like. If there is no conflict, method 400 continues to 416, where a response is generated that includes the requested information about the specific customer.

If one or more conflicting data values are identified at 408, method 400 determines an intended use for the requested information at 410 and, optionally, accesses similar information from one or more other data sources at 412. The intended use for the requested information includes, for example, a particular organization or department that will be using the requested information. If there is a conflict regarding a customer's email address, it may be helpful to know which organization or department wants to use the email address. If multiple email addresses are found in customer profiles for multiple organizations, the email address associated with the organization requesting the customer information is most likely to be the preferred email address for that situation. In some embodiments, the other data sources are external to the systems discussed herein and may be provided by a third party. An example external data source includes the United States Postal Service for mailing address information. If a particular customer has multiple addresses in multiple customer profiles, the United States Postal Service database is useful in determining which address is current and/or valid. Other data sources include other organizations or departments that maintain customer information related to the particular customer. The data value conflict is resolved based on the intended use for the requested information and/or similar information from one or more other data sources at 414. In other embodiments, the conflict is resolved based on the data value most recently used. For example, if there are conflicting mailing addresses among multiple customer profiles, the address most recently used (e.g., most recently used for shipping a package to the customer) is selected to resolve the data value conflict.

After resolving the data value conflict, a response is generated that includes the requested information about the customer at 416. The response is then communicated to a source of the request at 418. In some embodiments, the response includes data values identified from at least two different customer profiles associated with the specific customer. For example, a particular response may include a customer email address from a first customer profile, a customer mailing address from a second customer profile, and a customer phone number from a third customer profile.

Figure 5:
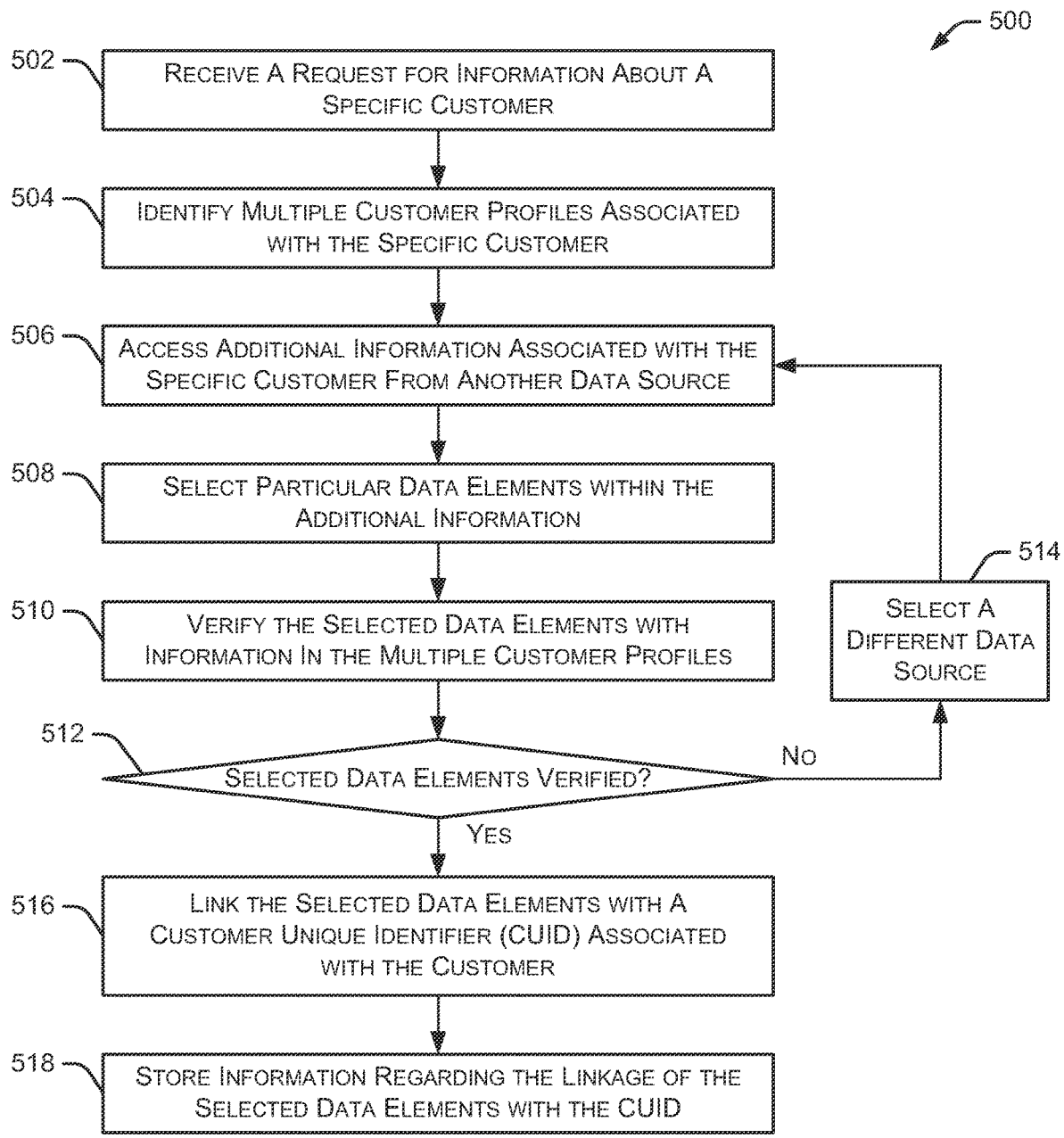
FIG. 5 is a flow diagram depicting an embodiment of a method for linking data from an external data source with customer profile information.

FIG. 5 is a flow diagram depicting an embodiment of a method 500 for linking data from an external data source with customer profile information. Initially, method 500 receives a request for information about a specific customer at 502. Method 500 continues by identifying multiple customer profiles associated with the specific customer at 504 and accessing additional information associated with the specific customer from another data source at 506. The additional information may be from any data source, including both data sources internal to the organization and data sources external to the organization. For example, the additional information may provide additional metadata regarding a customer, such as hobbies, work experience, purchasing habits, demographic information, psychographic characteristics, etc. This additional information is used to enrich customer profiles and provide additional data for customer analysis, targeted advertising, and the like. In some embodiments, other data sources may include data services, social media sites, and the like.

Method 500 continues by selecting particular data elements within the additional information at 508. For example, the selected data elements may include a customer name, customer address, customer email address, customer birth date, customer phone number, etc. The selected data elements are verified with information already contained in the multiple customer profiles at 510. For example, the customer's address or phone number in the selected data elements may be compared to corresponding data in one or more of the customer profiles. Since the customer profile data is presumed to be accurate, this comparison helps verify that the selected data elements are associated with the same customer.

If the selected data elements are not verified at 512, method 500 selects a different data source at 514 and returns to 506 to access additional information associated with the specific customer from the new data source selected at 514. For example, if the selected data elements contain different phone numbers, addresses or other differences in data, the data cannot be considered accurate and is disregarded. In this situation, a different data source is selected.

If the data elements are successfully verified at 512, method 500 links the selected data elements with a CUID associated with the customer at 516. Information regarding the linkage of the selected data elements with the CUID is then stored at 518 for future reference. By linking to the selected data elements, the customer profiles are not modified to incorporate the selected data elements. Instead, these data elements are linked to the CUID and become part of the overall description of the customer, such that the customer is represented as multiple customer profiles and other data elements accessed using the CUID. In alternate embodiments, if the data elements are successfully verified at 512, a record in the other data source (i.e., the record associated with the customer) is linked to the CUID and stored for future reference.

In some embodiments, method 500 selects particular data elements specifically for the purpose of verification (e.g., phone number, address or email address). If these particular data elements are verified, then additional data associated with the customer is accessed from the same data source and associated with the CUID as discussed herein.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A computer implemented method for conflict resolution and verification among multiple data sources, the method comprising:
    creating preliminary tables including encoded transactions and a decode between a customer unique identifier and other identifiers in an offline data source and an online data source;
    generating a legacy decode table based on identifiable data;
    generating a traceable decode table of traceable data based on the identifiable data;
    creating, using the preliminary tables, a cross-reference table including a column representing the customer unique identifier correlated to the legacy decode table and the traceable decode table;
    joining the legacy decode table and the traceable decode table through a cross-reference table that identifies transaction records across the online and offline data sources, by matching a primary key that identifies a characteristic of the identifiable data and the traceable data;
    extracting metadata, from the identifiable data and the traceable data, indicating a customer associated with the transaction records;
    generating a correlation associating the customer unique identifier and the extracted metadata;
    creating, using the customer unique identifier, links to different customer profiles of the customer within different organizations without combining any of the different customer profiles;
    determining a conflict between the different customer profiles with respect to information requested by an organization;
    solving the conflict among the different customer profiles by determining an intended use of the requested information;
    accessing additional information of the customer from other data sources including both an internal data source to the organization and an external data source to the organization;
    selecting within the additional information, data elements identifying the customer;
    verifying the data elements with information already contained in each of the different customer profiles by repeatedly selecting a different data source among the other data sources until finding a data source where the data elements and information contained in each of the different customer profiles are same;
    after verifying the data elements, accessing additional data associated with the customer from the same data source and re-associating the customer unique identifier with the additional data;
    generating a response with the requested information identified from the different customer profiles.

2. An apparatus comprising:
    a memory configured to store data and one or more sets of instructions; and
    one or more processors coupled to the memory, the one or more processors configured to execute the one or more sets of instructions and perform operations comprising:
        creating preliminary tables including encoded transactions and a decode between a customer unique identifier and other identifiers in an offline data source and an online data source;
        generating a legacy decode table based on identifiable data;
        generating a traceable decode table of traceable data based on the identifiable data;
        creating, using the preliminary tables, a cross-reference table including a column representing the customer unique identifier correlated to the legacy decode table and the traceable decode table;
        joining the legacy decode table and the traceable decode table through a cross-reference table that identifies transaction records across the online and offline data sources, by matching a primary key that identifies a characteristic of the identifiable data and the traceable data;
        extracting metadata, from the identifiable data and the traceable data, indicating a customer associated with the transaction records;
        generating a correlation associating the customer unique identifier and the extracted metadata;
        creating, using the customer unique identifier, links to different customer profiles of the customer within different organizations without combining any of the different customer profiles;
        determining a conflict between the different customer profiles with respect to information requested by an organization;
        solving the conflict among the different customer profiles by determining an intended use of the requested information;
        accessing additional information of the customer from other data sources including both an internal data source to the organization and an external data source to the organization;
        selecting within the additional information, data elements identifying the customer;
        verifying the data elements with information already contained in each of the different customer profiles by repeatedly selecting a different data source among the other data sources until finding a data source where the data elements and information contained in each of the different customer profiles are same;
        after verifying the data elements, accessing additional data associated with the customer from the same data source and re-associating the customer unique identifier with the additional data;
        generating a response with the requested information identified from the different customer profiles.

* * * * *